(12) United States Patent
Rhee

(10) Patent No.: US 7,522,746 B2
(45) Date of Patent: Apr. 21, 2009

(54) OBJECT TRACKING USING OPTICAL CORRELATION AND FEEDBACK

(75) Inventor: Que-Won Rhee, Menlo Park, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 627 days.

(21) Appl. No.: 11/202,806

(22) Filed: Aug. 12, 2005

(65) Prior Publication Data
US 2007/0036389 A1   Feb. 15, 2007

(51) Int. Cl.
*G06K 9/00* (2006.01)
(52) U.S. Cl. .................................... 382/103; 348/153
(58) Field of Classification Search ................. 382/103; 348/158, 153, 159
See application file for complete search history.

(56) References Cited

U.S. PATENT DOCUMENTS

| | | | |
|---|---|---|---|
| 5,578,813 A | 11/1996 | Allen et al. | |
| 5,644,139 A | 7/1997 | Allen et al. | |
| 5,786,804 A | 7/1998 | Gordon | |
| 6,281,882 B1 | 8/2001 | Gordon | |
| 6,507,366 B1 * | 1/2003 | Lee | 382/103 |
| 2002/0167537 A1 * | 11/2002 | Trajkovic | 345/649 |
| 2002/0176001 A1 * | 11/2002 | Trajkovic | 348/169 |
| 2003/0202102 A1 * | 10/2003 | Shiota et al. | 348/159 |
| 2005/0100087 A1 * | 5/2005 | Hasegawa et al. | 375/240.01 |
| 2006/0126738 A1 * | 6/2006 | Boice et al. | 348/168 |

OTHER PUBLICATIONS

Bae et al., "A new stereo object tracking system using disparity motion vector", Jun. 2003, Elsevier Science, pp. 23-35.*
Collins et al., "An active camera system for acquiring multi-view video", 2002, IEEE, pp. 517-520.*

* cited by examiner

*Primary Examiner*—John B Strege

(57) ABSTRACT

A motion-sensing device is used to track motion of an object. The motion-sensing device includes an optical correlator, a motor system and a controller. The optical correlator has an imager. The optical correlator provides a feedback signal that indicates motion of the object in at least one dimension based on detected movement of an image of the object from a first location within the imager to a second location within the imager. The motor system can move the imager. The controller receives the feedback signal from the optical correlator and uses the feedback signal to calculate motion of the object and to control the motor system to move the imager so that the image of the object is returned to the first location within the imager.

18 Claims, 2 Drawing Sheets

OBJECT TRACKING USING OPTICAL CORRELATION AND FEEDBACK

BACKGROUND

Motion of an object can be tracked based on video streams from a stationary camera. However, accurate tracking of motion generally requires fairly high-resolution images as well as sophisticated and computationally intense algorithms. When images are not recorded at a significantly high resolution and/or computational resources are limited, this can significantly reduce the ability to accurately track motion.

SUMMARY OF THE DISCLOSURE

In accordance with an embodiment of the present invention, a motion-sensing device is used to track motion of an object. The motion-sensing device includes an optical correlator, a motor system and a controller. The optical correlator has an imager. The optical correlator provides a feedback signal that indicates motion of the object in at least one dimension based on detected movement of an image of the object from a first location within the imager to a second location within the imager. The motor system can move the imager. The controller receives the feedback signal from the optical correlator and uses the feedback signal to calculate motion of the object and to control the motor system to move the imager so that the image of the object is returned to the first location within the imager.

DESCRIPTION OF THE EMBODIMENT

Figure 1:
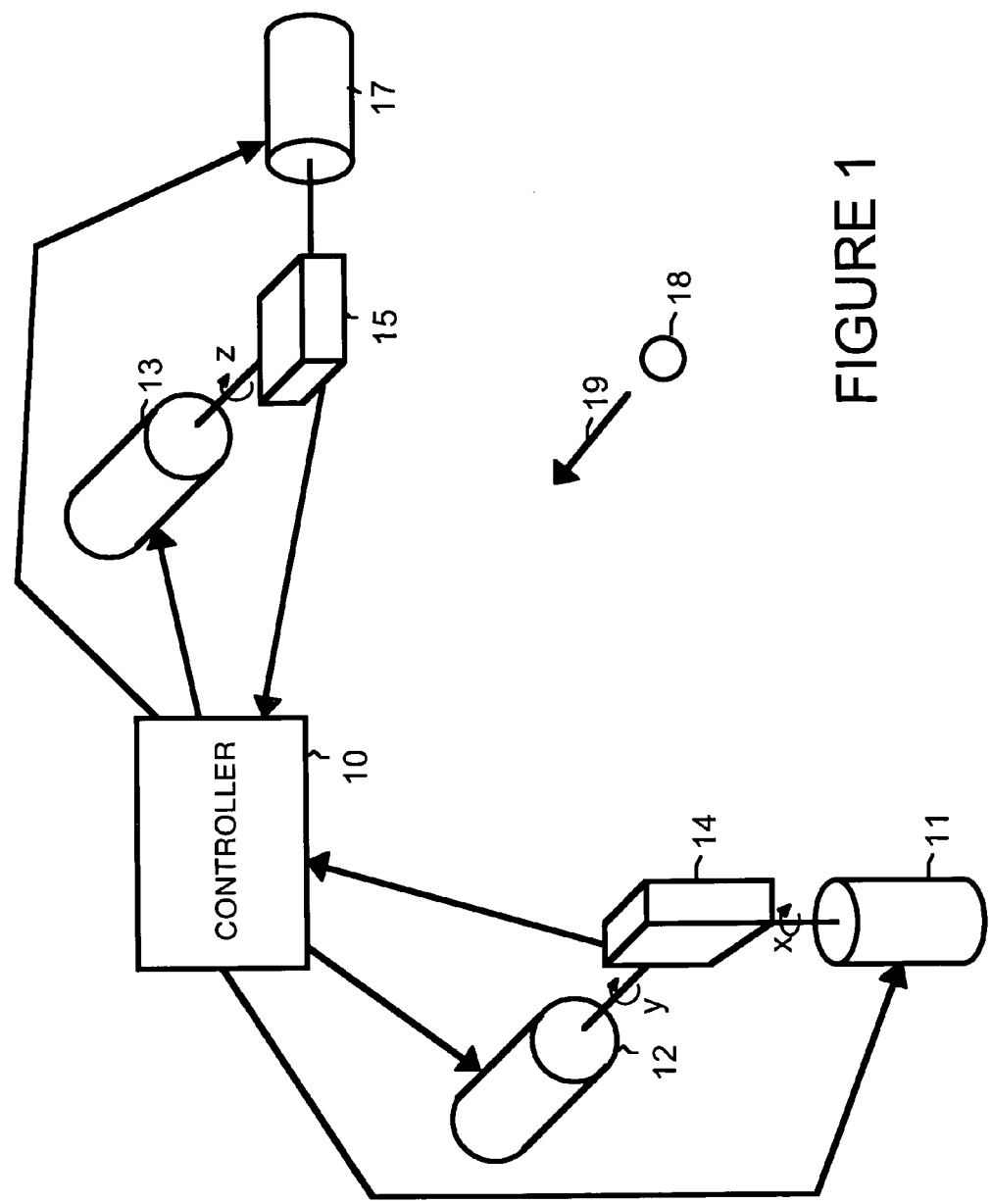
FIG. 1 shows a system in which an object is tracked using optical correlation and motion feedback in accordance with an embodiment of the present invention.

FIG. 1 shows a system in which an object 18 is tracked using optical correlation and motion feedback. An arrow 19 represents a direction of motion of object 18.

An optical correlator 14 tracks movement of object 18 in two dimensions, in an x-direction and in a y-direction. In order to do this, optical correlator 14 is rotated by a motor 11 and is rotated by a motor 12 until an image of object 18 is centered within an imager within optical correlator 14. While in the described embodiment of the present invention, the image of the object is centered, in other embodiments, the image of the object can be maintained at locations other than the center of the imager of optical correlator 14.

Once object 18 is centered within the imager within optical correlator 14, optical correlator 14 detects any movement of object 18 away from the center of the imager within optical correlator 14 in the x-direction and in the y-direction. The amount of detected movement in the x-direction and in the y-direction is sent as feedback by optical correlator 14 to a controller 10. Controller 10 uses the feedback from optical correlator 14 to determine movement of object 18 in the x-direction and in the y-direction. Controller 10 then controls motor 11 to rotate optical correlator 14 so that the image of object 18 is again centered in the x-direction within the imager within optical correlator 14. Likewise, controller 10 controls motor 12 to rotate optical correlator 14 so that the image 18 is again centered in the y-direction within the imager within optical correlator 14.

While the embodiment shown in FIG. 1 shows optical correlator 14 being rotated by motor 11 and motor 12 to maintain object 18 centered in the x-direction and in the y-direction within the imager within optical correlator 14, other types of motor systems can be used. For example, a motor system can be used to actually move optical correlator 14 in the x-direction and to move optical correlator 14 in the y-direction to maintain object 18 centered within the imager within optical correlator 14.

Further, while FIG. 1 shows all of optical correlator 14, including the imager, being within a single housing, and thus moved along with the imager, it is really only necessary to move the imager. Therefore, if one or more components of the optical correlator 14 are housed separately from the imager, these separately housed components of optical correlator 14 need not be moved, but only the imager needs to be rotated or otherwise moved by the motor system.

While use of a single optical correlator is sufficient to track motion of object 18 in two-dimensions, it is necessary to add another optical correlator when it is desired to track motion of object 18 in three-dimensions. For example, FIG. 1 shows an additional optical correlator 15 used to track movement of object 18 in the z-direction.

Once object 18 is centered within the imager within optical correlator 15, optical correlator 15 detects any movement of object 18 away from the center of the imager within optical correlator 15 in the z-direction and within the x-direction. The amount of detected movement in the z-direction is sent as feedback by optical correlator 15 to controller 10. Controller 10 uses the feedback from optical correlator 15 to determine movement of object 18 in the z-direction. Controller 10 then controls motor 13 to rotate optical correlator 15 so that the image 18 is again centered in the z-direction within the imager within optical correlator 15. Likewise, controller 10 controls motor 17 to rotate optical correlator 15 so that the image 18 is again centered in the x-direction within the imager within optical correlator 15.

While the embodiment shown in FIG. 1 shows optical correlator 15 being rotated by motor 13 and motor 17 to maintain object 18 centered in the z-direction and in the x-direction within the imager within optical correlator 15, other types of motors can be used, for example, to actually move optical correlator 15 in the z-direction and to move optical correlator 15 in the x-direction to maintain object 18 centered within the imager within optical correlator 15.

As will be understood by persons of ordinary skill in the art, the feedback from optical correlator 14 and optical correlator 15 is sufficient to determine the actual motion of object 18 in three dimensions.

In the embodiment shown in FIG. 1, correlator 14 and correlator 15 share the x-axis. In alternate embodiments there is no need to share a single axis. For example, as will be understood by persons of ordinary skill in the art, three-dimensional motion can be derived from two or more two-dimensional correlators operating along different axes, with no axis in common. Also, in the embodiment shown in FIG. 1, a single controller is used to control both correlator 14 and correlator 15. In alternate embodiments, correlator 14 and correlator 15 can each be controlled by a separate independent controller.

Figure 2:
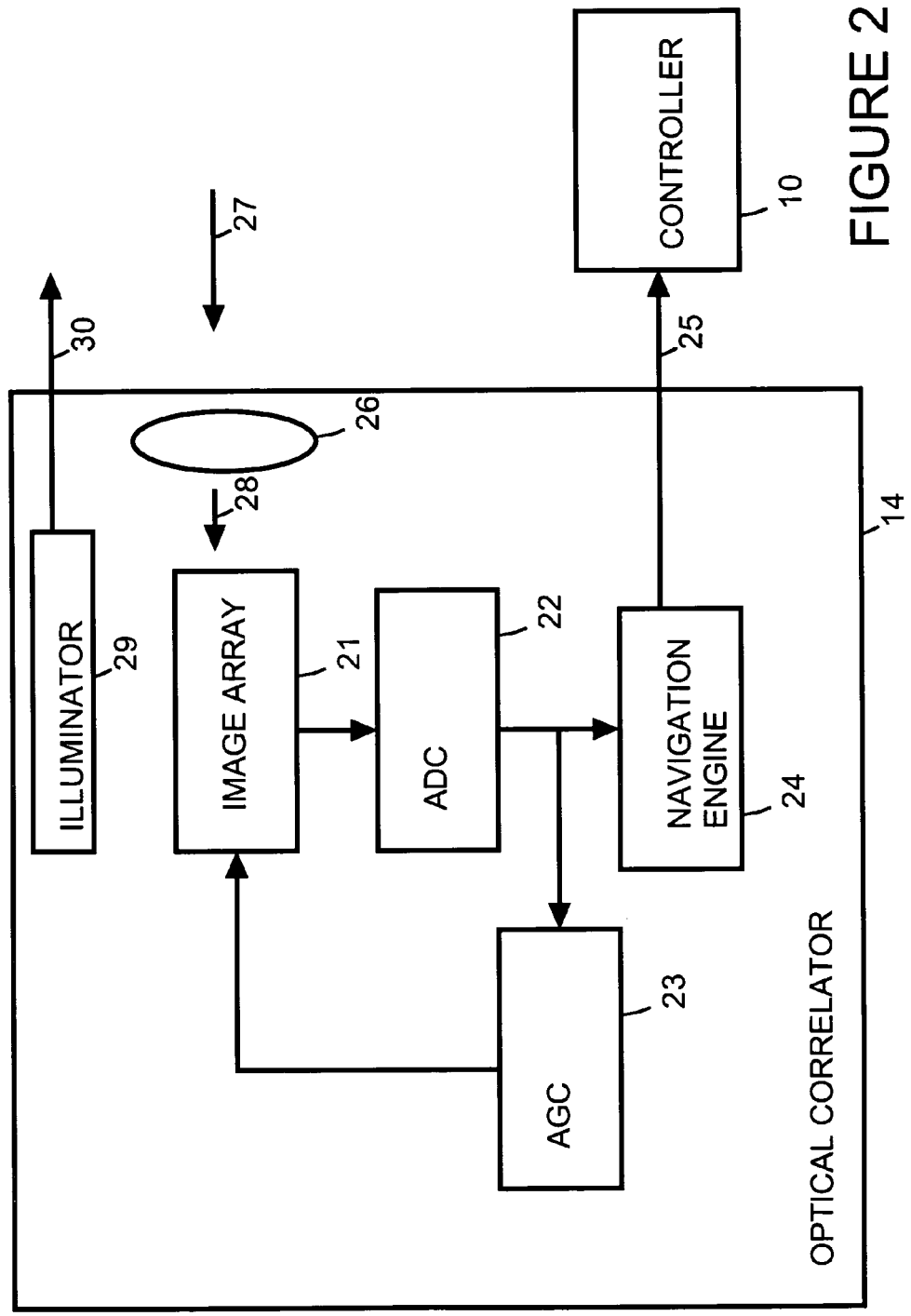
FIG. 2 shows a simplified block diagram of an optical correlator in accordance with an embodiment of the present invention.

FIG. 2 is a simplified block diagram of optical correlator 14. FIG. 2 is illustrative as other optical motion sensor circuitry can be used to implement optical correlator 14.

An optional illuminator 29 can be used to generate light, represented by arrow 30, that illuminates object 18. Optionally, other lighting, such as available ambient light, can be used to illuminate object 18.

Light 27, some of which, for example, is reflected from or generated by object 18, is focused by lens 26 to produce focused light 28 received by an imager 21. Imager 21 is implemented, for example, using a 32 by 32 array of photodetectors. Alternatively, other array sizes and/or other light detecting devices can be used, dependent upon the image resolution desired to give sufficient information for a particular application.

An analog-to-digital converter (ADC) 22 receives analog signals from imager 12 and converts the signals to digital data. An automatic gain control (AGC) 23 evaluates digital data received from ADC 22 and controls shutter speed and gain adjust within imager 12. This is done, for example, to prevent saturation or underexposure of images captured by imager 12.

A navigation engine 24 evaluates the digital data from ADC 22 and performs a correlation to calculate overlap of images and to determine shift between images in order to detect motion of object 18. For example, the correlation is performed using an image processing algorithm such as a convolution, or can be performed in another way to detect motion of object 18. Navigation engine 24 determines a change in location in the "x" direction (delta x value) and determines a change in location in the "y" direction (delta y value) which are both placed on an output 25 to be forwarded to controller 10. The delta x values and delta y values calculated by navigation engine can be transmitted immediately and continuously to controller 10, or, alternatively, can be stored by navigation engine 24 and delivered to controller 10 as a response to a query from controller 10.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A motion-sensing device used to track motion of an object, comprising:
   a first optical correlator having a first imager, the first optical correlator providing a first feedback signal that indicates motion of the object exclusively in first and second directions based on detected movement of a first image of the object from a first location within the first imager to a second location within the first imager, the first and second directions being perpendicular to each other;
   a first motor system that can move the first imager;
   a second optical correlator having a second imager, the second optical correlator providing a second feedback signal that indicates motion of the object exclusively in a third direction based on detected movement of a second image of the object from a first location within the second imager to a second location within the second imager, the third direction being perpendicular to the first and second directions;
   a second motor system that can move the second imager; and
   a controller that receives the first feedback signal from the first optical correlator and uses the feedback signal to calculate motion of the object and to control the first motor system to move the first imager so that the image of the object is returned to the first location within the imager, wherein the controller receives the second feedback signal from the second optical correlator and uses the second feedback signal to calculate motion of the object in the third direction and to control the second motor system to move the second imager.

2. A motion-sensing device as in claim 1 wherein the first location of the first image of the object is a center of the first imager.

3. A motion-sensing device as in claim 2 wherein the first motor system is configured to move the first imager in the first direction and to move the first imager in the second direction to maintain the first image of the object centered within the first imager.

4. A motion-sensing device as in claim 1 wherein the first motor system physically moves the first imager by rotating the first optical correlator around two perpendicular axes.

5. A motion-sensing device as in claim 1 wherein the first imager is an array of photodetectors.

6. A motion-sensing device as in claim 1 wherein the first motor system includes two motors, a first motor rotates the first optical correlator around a first axis, and a second motor rotates the first optical correlator around a second axis, the first axis being perpendicular to the second axis.

7. A method for tracking motion of an object, comprising:
   detecting movement of a first image of the object from a first location within a first imager to a second location within the imager;
   generating a first feedback signal that indicates motion of the object exclusively in a first and second direction based on the detected movement of the first image of the object from the first location to the second location within the first imager, the first and second directions being perpendicular to each other;
   using the first feedback signal to calculate motion of the object and to control a first motor system to move the first imager so that the first image of the object is returned to the first location within the first imager;
   detecting movement of a second image of the object from a first location within a second imager to a second location within the second imager;
   generating a second feedback signal that indicates motion of the object exclusively in a third direction based on the detected movement of the second image of the object from the first location to the second location within the second imager, the third direction being perpendicular to the first and second directions; and
   using the second feedback signal to calculate motion of the object in the third direction and to control a second motor system to move the second imager so that the second image of the object is returned to the first location within the second imager.

8. A method as in claim 7 wherein the first location of the first image of the object is a center of the first imager.

9. A method as in claim 7 wherein the first motor system moves the first imager in the first direction and moves the first imager in the second direction to maintain the first image of the object centered within the first imager.

10. A method as in claim 7 wherein the first motor system physically moves the first imager by rotating the first imager around two perpendicular axes.

11. A method as in claim 7 wherein the first imager is an array of photodetectors.

12. A method as in claim 7 wherein the motor system includes two motors, a first motor rotates the first imager around a first axis, and a second motor rotates the first imager around a second axis, the first axis being perpendicular to the second axis.

13. A motion-sensing device used to track motion of an object, comprising:

means for providing a first feedback signal that indicates motion of the object exclusively in first and second directions based on detected movement of a first image of the object from a first location within a first imager to a second location within the first imager, the first and second directions being perpendicular to each other;

means for moving the first imager;

means for using the first feedback signal to calculate motion of the object and to control the means for moving the first imager to move the first imager so that the first image of the object is returned to the first location within the first imager;

means for providing a second feedback signal that indicates motion of the object exclusively in a third direction based on detected movement of a second image of the object from a first location within a second imager to a second location within the second imager, the third direction being perpendicular to the first and second directions;

means for moving the second imager; and using the second feedback signal to calculate motion of the object in the third direction and to control a second motor system to move the second imager so that the second image of the object is returned to the first location within the second imager.

14. A motion-sensing device as in claim 13 wherein the first location of the first image of the object is a center of the first imager.

15. A motion-sensing device as in claim 14 wherein the first motor system is configured to move the first imager in the first direction and to move the first imager in the second direction to maintain the first image of the object centered within the first imager.

16. A motion-sensing device as in claim 13 wherein the means for moving the first imager physically moves the first imager by rotating a housing of the first imager around two perpendicular axes.

17. A motion-sensing device as in claim 13 wherein the first imager is an array of photodetectors.

18. A motion-sensing device as in claim 13 wherein the means for moving the first imager includes two motors, a first motor rotates a housing for the first imager around a first axis, and a second motor rotates the housing for the first imager around a second axis, the first axis being perpendicular to the second axis.

* * * * *

UNITED STATES PATENT AND TRADEMARK OFFICE
CERTIFICATE OF CORRECTION

PATENT NO. : 7,522,746 B2
APPLICATION NO. : 11/202806
DATED : April 21, 2009
INVENTOR(S) : Que-Won Rhee It is certified that error appears in the above-identified patent and that said Letters Patent is hereby corrected as shown below:

Column 3, Line 66, Claim 1, after "uses the" insert --first--.

Column 4, Line 31 (approx.), Claim 7, after "in" delete "a".

Column 4, Line 31 (approx.), Claim 7, delete "direction" and insert --directions--.

Column 4, Line 66, Claim 12, after "wherein the" insert --first--.

Signed and Sealed this
Twenty-eighth Day of December, 2010

David J. Kappos
*Director of the United States Patent and Trademark Office*